(12) United States Patent
Brighenti

(10) Patent No.: US 8,060,273 B2
(45) Date of Patent: Nov. 15, 2011

(54) METHOD FOR DIAGNOSING A COMPONENT OF A VEHICLE

(75) Inventor: Attilio Brighenti, Venice (IT)

(73) Assignee: S.A.T.E.—Systems and Advanced Technologies Engineering S.r.l. (IT)

( * ) Notice: Subject to any disclaimer, the term of this patent is extended or adjusted under 35 U.S.C. 154(b) by 674 days.

(21) Appl. No.: 12/182,562

(22) Filed: Jul. 30, 2008

(65) Prior Publication Data

US 2009/0062977 A1 Mar. 5, 2009

(30) Foreign Application Priority Data

Jul. 30, 2007 (IT) ............................... BO2007A0531

(51) Int. Cl.
*G01M 17/00* (2006.01)
(52) U.S. Cl. ................ 701/29; 701/30; 701/36; 701/67; 340/438
(58) Field of Classification Search .................... 701/29, 701/30, 36, 54, 67, 101; 340/425.5, 438, 340/439
See application file for complete search history.

(56) References Cited

U.S. PATENT DOCUMENTS

| 2005/0046584 A1* | 3/2005 | Breed ....................... 340/825.72 |
| 2006/0208169 A1* | 9/2006 | Breed et al. ................... 250/221 |

\* cited by examiner

*Primary Examiner* — Gertrude Arthur Jeanglaude
(74) *Attorney, Agent, or Firm* — Banner & Witcoff, Ltd.

(57) ABSTRACT

A method for diagnosing a component of a vehicle, which presents the steps of: identifying a series of classes, each of which is associated to a given mode of operation of the component; identifying at least one control signal of the component; providing a mathematical model of the component designed to classify an evolution in time of the control signal, assigning a respective class to the evolution in time of the control signal itself; detecting a number of evolutions in time of the control signal; classifying each evolution in time of the control signal by the mathematical model of the component; and determining a diagnosis of the component on the basis of the classification of the evolutions in time of the control signal.

39 Claims, 5 Drawing Sheets

METHOD FOR DIAGNOSING A COMPONENT OF A VEHICLE

TECHNICAL SECTOR

The present invention relates to a method for diagnosing a component of a vehicle.

The present invention finds advantageous application to an automobile, to which the ensuing treatment will make explicit reference, without this implying any loss of generality.

BACKGROUND ART

Present in a modern automobile are numerous components subject to wear that hence can present malfunctioning. In many cases, in the event of malfunctioning of a component, driving of the automobile proves impossible or at least markedly limited. It is consequently necessary to envisage a preventive maintenance in order to seek to limit as much as possible any sudden malfunctioning of a component during driving of the automobile. For this reason, automobiles manufacturers envisage replacement and/or overhauling of a certain number of components at pre-set intervals of mileage and/or of life. However, it is very difficult to foresee precisely the effective duration of a component in so far as, on account of the inevitable constructional tolerances and of the different service lives, two apparently identical components may have markedly different effective durations. This forces manufacturers to make a choice, namely, whether to privilege the reliability at the expense of economy of service and hence replace the components on the basis of the worst situation, or else to privilege the economy of service at the expense of reliability and hence replace the components on the basis of the best situation. Both of the choices present advantages and disadvantages, and it is very difficult to find an optimal balance. In any case, whatever the choice made, there will always be customers that are not satisfied (on account of the reduced reliability or on account of the high operating costs).

In order to seek a solution to the problem described above methods for diagnosing components of automobiles have been proposed, said diagnostic methods ought to be able to foresee when a component starts to function in an improper way (even though it still functions, i.e., long before it fails altogether) to signal in due time to the driver the need to carry out in a short time (but not a particularly short time) a maintenance intervention. In this way, it is possible to obtain at the same time high reliability and high economy of service.

However, the diagnostic methods proposed up to now present various drawbacks in so far as they are costly to implement (on account of the computing power required and/or the need to install additional sensors that are normally not present on board an automobile) and are not very effective (i.e., they are frequently not able to provide correct diagnoses).

DISCLOSURE OF THE INVENTION

The aim of the present invention is to provide a method for diagnosing a component of a vehicle, said diagnostic method being free from the drawbacks described above and being at the same time easy and inexpensive to implement.

According to the present invention, a method for diagnosing a component of a vehicle is provided according to what is claimed in the attached claims.

BRIEF DESCRIPTION OF THE DRAWINGS

The present invention will be now described with reference to the annexed drawings, which illustrate some non-limiting examples of embodiment thereof, an in which.

BEST MODE FOR CARRYING OUT THE INVENTION

Figure 1:
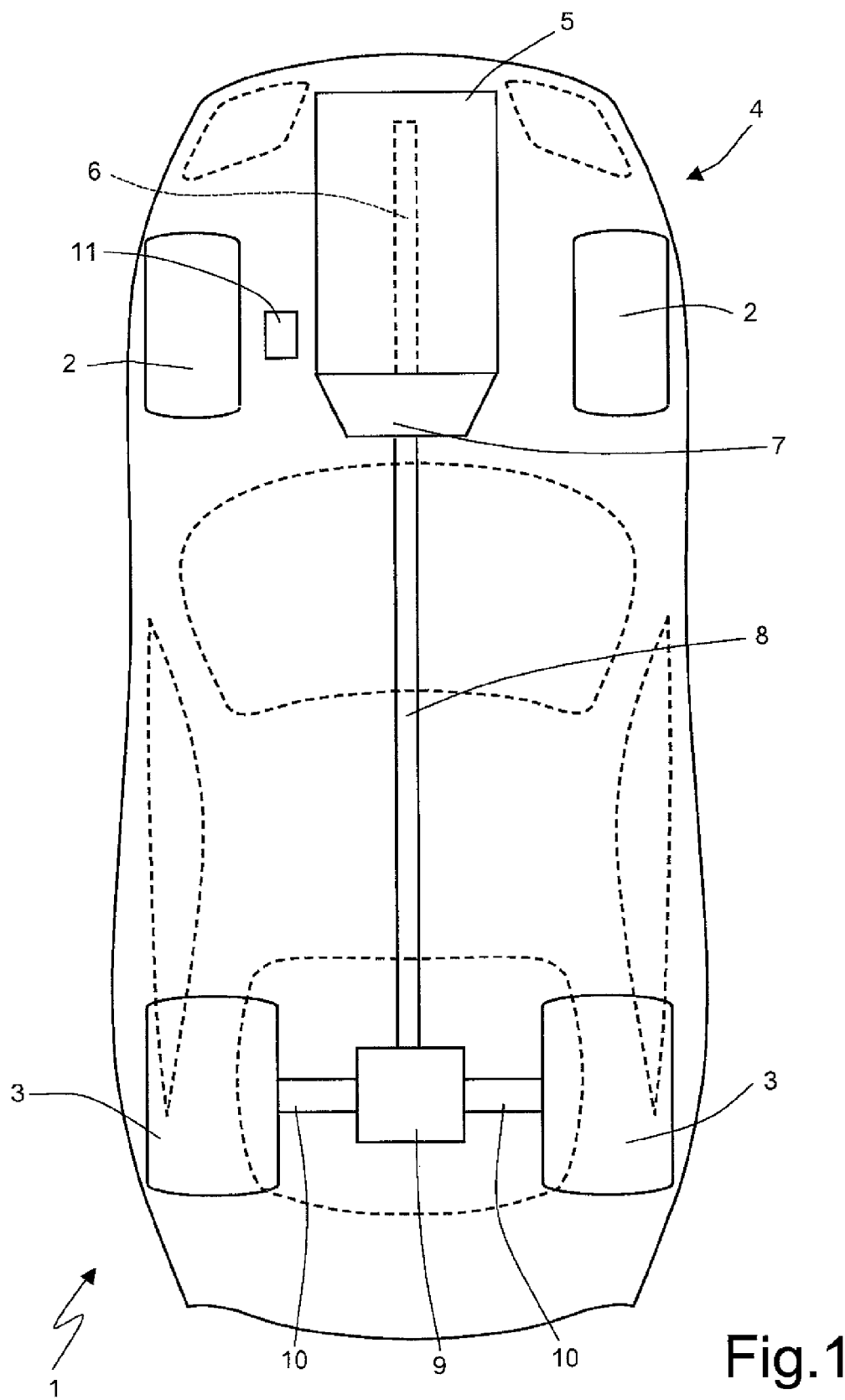
FIG. 1 is a schematic plan view of an automobile provided with an electronic control unit in which the diagnostic method of the present invention is implemented.

In FIG. 1, the reference number 1 designates as a whole an automobile provided with two front wheels 2 and of two rear driving wheels 3, which receive the torque from an engine unit 4.

The engine unit 4 comprises an internal-combustion engine 5, which is set in a front position and is provided with a crankshaft 6 that turns at an angular velocity $\omega_m$, and a servo transmission 7, which is set in a front position, is housed in a bell fixed with respect to the internal-combustion engine 5 and transmits the torque generated by the internal-combustion engine 5 to the rear driving wheels 3. Departing from the servo transmission 7 is a transmission shaft 8 terminating in a differential 9 (possibly of a self-blocking type with hydraulic actuation), departing from which is a pair of axle shafts 10, each of which is fixed with respect to a rear driving wheel 3. The motor vehicle 1 comprises an electronic control unit 11 (illustrated schematically), which controls the engine unit 4 and hence drives both the internal-combustion engine 5 and the servo transmission 7.

Figure 2:
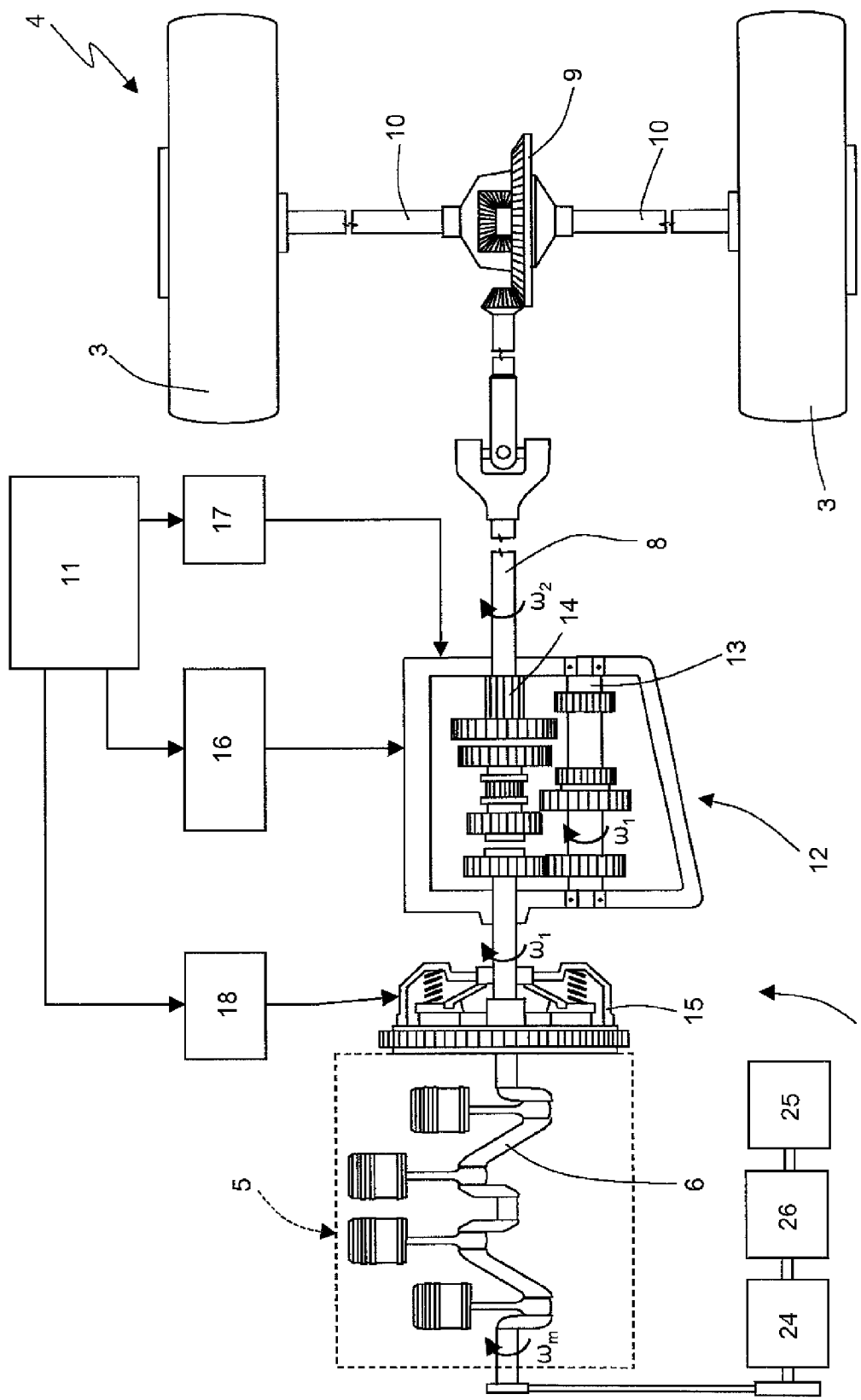
FIG. 2 is a schematic view of an engine unit of the automobile of FIG. 1.

According to what is illustrated in FIG. 2, the servo transmission 7 comprises a servo mechanical gear change 12 provided with a primary shaft 13 that turns at an angular velocity $\omega_1$ and can be connected to the crankshaft 6, and a secondary shaft 14 that turns at an angular velocity $\omega_2$ and is connected to the transmission shaft 8, which transmits motion to the driving wheels 3. Set between the crankshaft 6 and the primary shaft 13 of the gear change 12 is a plate-type servo clutch 15 for connecting and disconnecting the crankshaft 6 to the primary shaft 13 of the gear change 12.

The servo mechanical gear change 12 is actuated by a hydraulic actuator 16 for engaging/disengaging a gear and by a hydraulic actuator 17 for selecting a gear. The servo clutch 15 is actuated by a single proportional hydraulic actuator 18 for regulating the clutch 15 itself between an open position and a closed position. The hydraulic actuators 16, 17 and 18 are driven by the electronic control unit 11 and are connected to a hydraulic circuit 19 (illustrated in FIG. 3).

According to a different embodiment (not illustrated), in the servo mechanical gear change 12, the primary shaft 13 and the secondary shaft 14 are mechanically coupled to one another by means of a plurality of gear pairs, each of which defines a respective gear speed and comprises a primary gear wheel mounted on the primary shaft 13 and a secondary gear wheel mounted on the secondary shaft 14. In each gear pair that defines a respective gear speed, the primary gear always meshes with the respective secondary gear. In addition, in each gear pair one gear is rigidly mounted on its own shaft, whilst the other gear is mounted idle on its own shaft and is coupled to a synchronizer designed to be actuated for engaging the other gear itself to its own shaft (i.e., to render the gear fixed with respect to the shaft). Each synchronizer is mounted coaxial to a shaft between two gears in such a way as to be displaced by a respective hydraulic actuator in one direction to engage a gear to the shaft or else to be displaced in the other direction to engage the other gear to the shaft.

Figure 3:
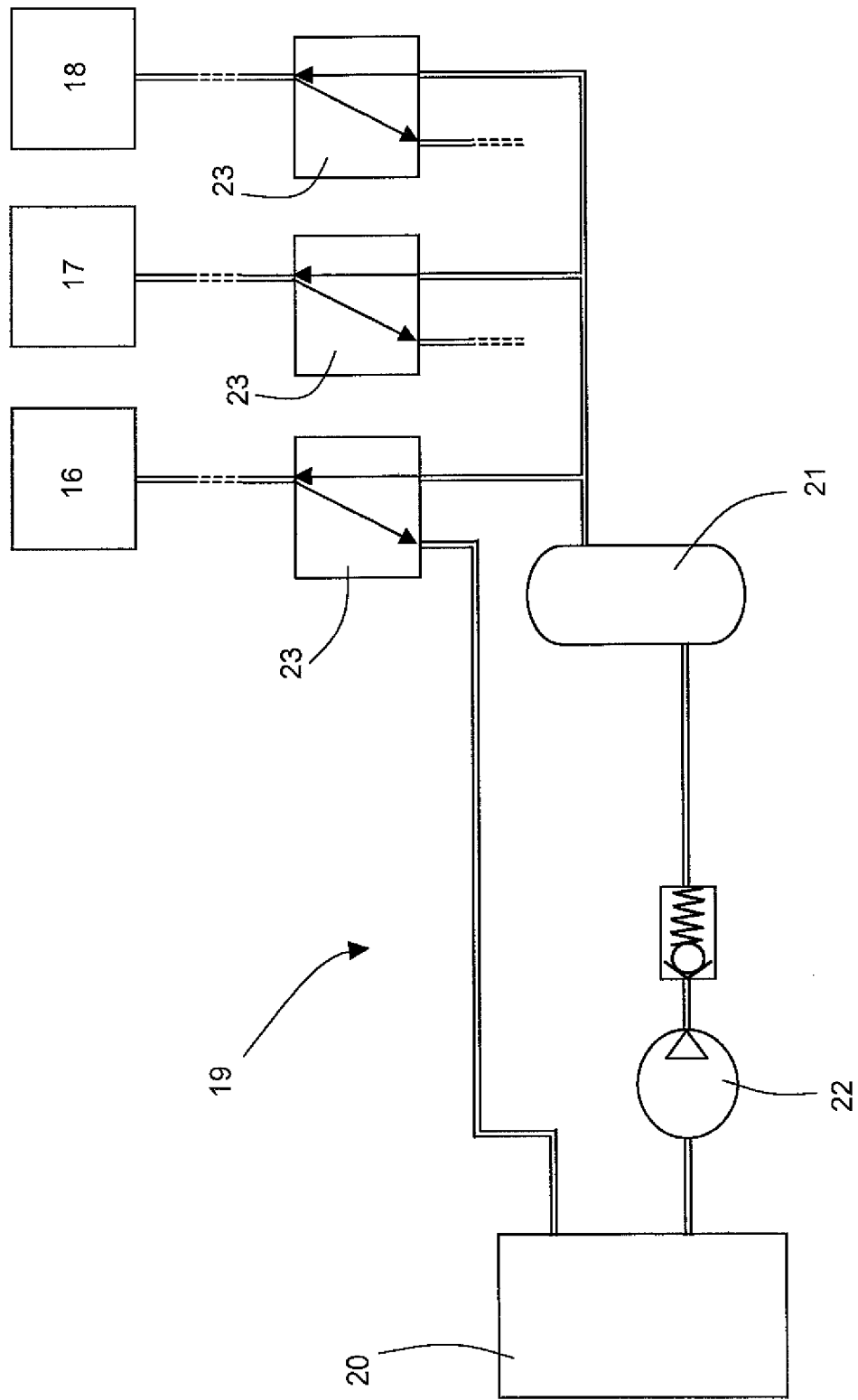
FIG. 3 is a schematic view of a hydraulic circuit of a transmission with gear reducer and other servo functions of the engine unit of FIG. 2.

According to what is illustrated in FIG. 3, the hydraulic circuit 19 comprises a storage tank 20 containing the driving fluid (typically oil) at ambient pressure used by the hydraulic actuators 15, 16 and 17, a hydraulic accumulator 21 containing pressurized driving fluid, a pump 22, which draws the driving fluid from the storage tank 20 and supplies the pressurized driving fluid to the hydraulic accumulator 21, and three solenoid valves 23, which are designed to connect chambers of the respective hydraulic actuators 15, 16 and 17 with the storage tank 20 and with the hydraulic accumulator 21 selectively. In particular, associated to each chamber of the hydraulic actuators 15, 16 and 17 is a respective three-way solenoid valve 23, which is designed to keep the chamber isolated so as to maintain the driving fluid present inside the chamber constant, to connect the chamber to the storage tank 20 for discharging the driving fluid present within the chamber, or else to connect the chamber to the hydraulic accumulator 21 for supplying the chamber with driving fluid. The pump 22 is activated when the pressure $P_a$ within the hydraulic accumulator 21 is lower than a minimum value $P_{a,min}$, and the pump is de-activated when the pressure $P_a$ within the hydraulic accumulator 21 is higher than a maximum value $P_{a,max}$.

According to what is illustrated in FIG. 2, an alternator 24 is provided, which receives motion directly from the crankshaft 6 by means of a belt transmission and generates the electrical energy necessary for operation of the electrical loads of the automobile 1. The alternator 24 is electrically connected to a battery 25 by interposition of an electronic rectifier 26.

Implemented in the electronic control unit 11 is a method for diagnosing the servo mechanical gear change 12 as regards the operations for engaging a new gear. Said diagnostic method envisages identifying in the design and/or setting-up stage a series of classes, each of which is associated to a given mode of operation of the servo mechanical gear change 12. In the example illustrated in FIG. 4, four classes are envisaged: engagement with synchronization pause (identified by number "3" in FIG. 4), regular engagement (identified by number "1" in FIG. 4), false meshing, i.e, engagement in two goes (identified by number "2" in FIG. 4), and engagement with clashing of the gears (identified by number "4" in FIG. 4).

Figure 4:
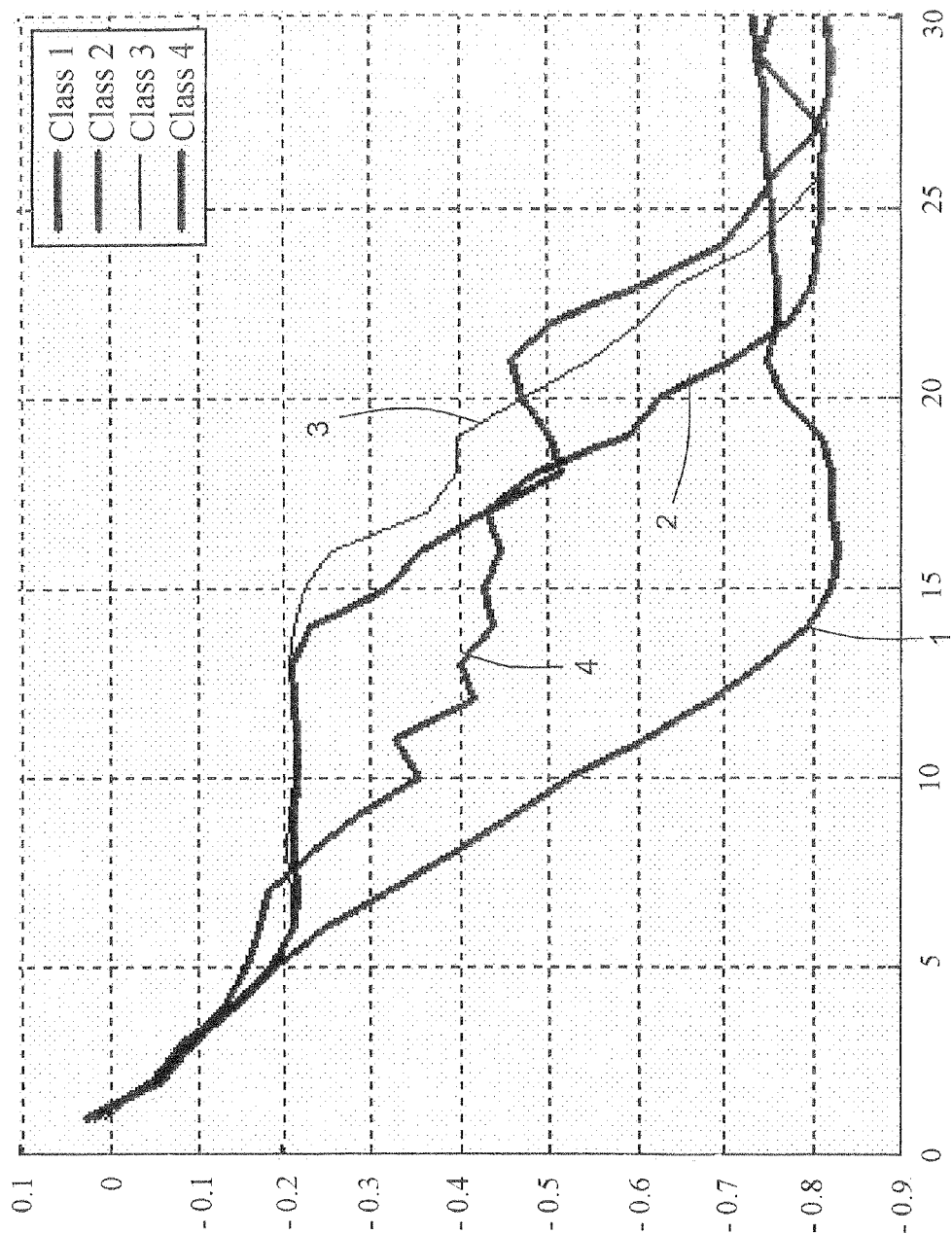
FIG. 4 is a graph that represents some possible evolutions in time of the position of an actuator for engaging a servo mechanical gear change of the engine unit of FIG. 2 during different gear changes.

In addition, the diagnostic method envisages identifying in the design stage at least one control signal of the servo mechanical gear change 12, which, according to a preferred embodiment, is represented by the position of the engagement actuator 16. In particular, illustrated in FIG. 4 are four different possible evolutions in time of the position of the engagement actuator 16 according to the four classes defined above.

Next, the diagnostic method envisages providing in the design stage a mathematical model of the servo mechanical gear change 12 designed to classify an evolution in time of the control signal (i.e., of the position of the engagement actuator 16) assigning a respective class to the evolution in time of the control signal itself. The classification of each evolution in time of the control signal by means of the mathematical model of the servo mechanical gear change 12 envisages assigning to the evolution in time of the control signal an index of membership in each class and then identifying the evolution in time of the control signal as belonging to the class with respect to which it has the highest index of membership. An evolution in time of the control signal is considered as not classified if it is not possible to identify a class with respect to which the evolution in time of the control signal has the highest index of membership, i.e., if the difference between the two highest indices of membership is not significant (that is, higher than a given threshold value).

Preferably, the mathematical model of the servo mechanical gear change 12 uses for each class a respective neural network of known type, which provides the index of membership in the class itself of an evolution in time of the control signal (i.e., of the position of the engagement actuator 16). By way of example, a description of neural networks that can be used in the mathematical model of the servo mechanical gear change 12 can be found in the following publications:

1. Hagan M. T., Demuth H. B., Beale M. "Neural Network Design", PWS Publ. Co., 1995
2. Ingrassia S., Davino C.: "Reti neurali e metodi statistici", Franco Angeli Edizioni, 2002

In order to "train" each neural network, in the design and setting-up stage a set of samples is obtained, each of which is constituted by an evolution in time of the control signal obtained experimentally and by a respective class of membership (normally identified by an operator on the basis of his own experience). Once obtained, the set of samples is used for defining the mathematical model of the servo mechanical gear change 12, thus "training" the neural networks.

According to a preferred embodiment, the mathematical model of the servo mechanical gear change 12 envisages at input the evolution in time of the position of the engagement actuator 16, the velocity of rotation of the crankshaft 6, and the gear engaged and/or to be engaged. Consequently, the mathematical model of the servo mechanical gear change 12 is parameterized as a function of the velocity of rotation of the crankshaft 6 and of the gear to be engaged.

During normal operation of the servo mechanical gear change 12, the electronic control unit 11 detects the evolutions in time of the control signal (i.e., of the position of the engagement actuator 16), classifies each evolution in time of the control signal by means of the mathematical model of the servo mechanical gear change 12, and determines a diagnosis of the servo mechanical gear change 12 on the basis of the classification of the evolutions in time of the control signal.

Determining a diagnosis of the servo mechanical gear change 12 on the basis of the classification of the evolutions in time of the control signal envisages, for example, considering a set of temporally consecutive classifications of evolutions in time of the control signal, determining the frequency percentage of each class in the set of classifications, and determining a diagnosis of the servo mechanical gear change 12 on the basis of the frequency percentages. In particular, the diagnosis of the servo mechanical gear change 12 is determined on the basis of the values of the frequency percentages and/or on the basis of the trends of the frequency percentages (i.e., on the basis of the value of the first time derivative of the frequency percentages). For example, a malfunctioning of the servo mechanical gear change 12 is diagnosed if at least one class associated to a faulty behaviour (for example, the class of fast engagement in two goes or else the class of fast engagement with clashing of the gears) has an excessively high frequency and/or has a tendency to increase progressively over time.

To provide a numeric example, we shall assume that it is normal that in the case of frequent fast gear changes there is present a frequency not higher than 20% of engagement with clashing of the gears and a frequency not higher than 30% of false meshing, i.e, engagement in two goes. If a frequency of 60% of fast engagement with clashing of the gears is detected, the electronic control unit 11 signals a fault in the servo mechanical gear change 12. Likewise, if the frequency of fast engagement with clashing of the gears shows a pattern in time that is always rising, the electronic control unit 11 can signal in a short time that there is a fault in the servo mechanical gear change 12 (even if the frequency of fast engagement with clashing of the gears has not yet exceeded the limit of 20%).

According to a preferred embodiment, the mathematical model of the servo mechanical gear change 12 uses a probabilistic algorithm for determining an index of validity of each evolution in time of the control signal, said index of validity indicating the degree of membership of the evolution in time of the control signal to the set of samples used for defining the mathematical model of the servo mechanical gear change 12. In other words, the index of validity signals whether an evolution in time of the control signal is sufficiently similar to the set of samples used for defining the mathematical model of the servo mechanical gear change 12. In fact, only if an evolution in time of the control signal is sufficiently similar to the set of samples used for defining the mathematical model of the servo mechanical gear change 12, will the classification carried out by the mathematical model of the servo mechanical gear change 12 be precise and reliable. Consequently, the reliability of the classification of each evolution in time of the control signal is assessed as a function of the respective index of validity, and if an index of validity is too low (i.e., lower than a given threshold value), the corresponding classification is rejected (if the rejection of the classifications were to occur too often, it would be necessary to define better the mathematical model of the servo mechanical gear change 12 using a much larger set of samples or a different neural network).

The diagnostic method described above could be applied also to another component of the automobile 1 different from the servo mechanical gear change 12 and in general envisages: identifying a series of classes, each of which is associated to a given mode of operation of the component; identifying at least one control signal of the component; providing a mathematical model of the component designed to classify an evolution in time of the control signal, assigning a respective class to the evolution in time of the control signal itself; detecting a number of evolutions in time of the control signal; classifying each evolution in time of the control signal by means of the mathematical model of the component; and determining a diagnosis of the component on the basis of the classification of the evolutions in time of the control signal.

The diagnostic method described above presents numerous advantages in so far as it enables provision of an effective and efficient preventive diagnosis of components of the automobile 1 (such as, for example, the servo mechanical gear change 12 during the engagement step) that cannot otherwise be diagnosed in a preventive way. It should be noted that the diagnostic method described above is not only able to signal whether a component is effectively functioning badly, but also to signal whether a component has an increasing tendency to malfunctioning albeit currently operating in a still acceptable way.

In the electronic control unit 11, a method for diagnosing the alternator 24 is implemented, which envisages identification in the design stage of a number of input signals of the alternator 24 and a number of output signals of the alternator 24. According to a preferred embodiment, the input signals are the velocity of rotation of a rotor of the alternator 24 (which can be obtained directly from the velocity of rotation of the crankshaft 6), the voltage of the battery 25, the current supplied by the alternator 24, and the temperature of the alternator 24 (as an alternative to the temperature of the alternator 24, the temperature of an engine compartment in which the internal-combustion engine 5 is housed could be used, or else the temperature of a liquid for cooling the internal-combustion engine 5); the output signals comprise only the current supplied by the alternator 24 (it should be noted that the current supplied by the alternator 24 at the same time belongs both to the input signals and to the output signals).

In addition, in the design stage a mathematical model of the alternator 24 in normal operating conditions is provided, which, as a function of the values of the input signals, is able to supply the values of the output signals. Preferably, the mathematical model of the alternator 24 uses a neural network for simulating the output signals as a function of the input signals. By way of example, a description of neural networks that can be used in the mathematical model of the servo mechanical gear change 12 can be found in the following publications:

1. Hagan M. T., Demuth H. B., Beale M. "Neural Network Design", PWS Publ. Co., 1995
2. Ingrassia S., Davino C.: "Reti neurali e metodi statistici", Franco Angeli Edizioni, 2002

In order to "train" the neural network, in the design and setting-up stage a set of samples is obtained, each of which is made up of values measured experimentally of the input signals and of the output signals. Once obtained, the set of samples is used for defining the mathematical model of the alternator 24, thus "training" the neural network.

During normal operation of the alternator 24, the electronic control unit 11 measures the actual values of the input signals, measures the actual values of the output signals (i.e., of the current supplied by the alternator 24), determines the estimated values of the output signals (i.e., of the current supplied by the alternator 24) using the mathematical model of the alternator 24 and the actual values of the input signals, compares the estimated values of the output signals with the respective actual values of the output signals, and determines a diagnosis of the alternator 24 on the basis of the comparison between the estimated values of the output signals and the actual values of the output signals. In particular, the diagnosis of the alternator 24 is determined on the basis of the deviation between the estimated values of the output signals and the actual values of the output signals and/or on the basis of the trend of the deviation between the estimated values of the output signals and the actual values of the output signals (i.e., on the basis of the first time derivative of the deviation between the estimated values of the output signals and the actual values of the output signals). Obviously, in order to compensate for possible accidental errors, there is not considered just one value of the deviation between the estimated values of the output signals and the actual values of the output signals, but a number of successive values of the deviation are considered, on which statistical analyses are carried out (for example, moving averages).

According to a preferred embodiment, the mathematical model of the alternator 24 uses a probabilistic algorithm for determining an index of validity of the estimated values of the output signals, said index of validity indicating the degree of membership of the actual values of the output signals in the set of samples used for defining the mathematical model of the alternator 24. In other words, the index of validity signals whether a set of actual values of the output signals is sufficiently similar to the set of samples used for defining the mathematical model of the alternator 24. In fact, only if a set of actual values of the output signals is sufficiently similar to the set of samples used for defining the mathematical model of the alternator 24, will the estimated value of the output signals (i.e., the current supplied by the alternator 24) provided by the mathematical model of the alternator 24 be precise and reliable. Consequently, the reliability of the estimate of the output signals (i.e., the current supplied by the alternator 24) is assessed as a function of the respective index of validity, and if an index of validity is too low (i.e., lower than a given threshold value), the corresponding estimate of the output signals is rejected (if the rejection of the estimates of the output signals were to occur too often, it would be necessary to define better the mathematical model of the alternator 24 using a much larger set of samples or a different neural network).

A similar diagnostic method is used also for a diagnosis of the hydraulic circuit 19. In this case, the input signals comprise the pressure $P_a$ of the driving fluid within the hydraulic accumulator 21, the logic signal of activation of the pump 22, the logic signal of activation of the solenoid valves 23, and the temperature of the driving fluid. Instead, the output signals comprise the pressure $P_a$ of the driving fluid within the hydraulic accumulator 21, which belongs at the same time both to the input signals and to the output signals.

In this case, the mathematical model of the hydraulic circuit 19 enables the estimated value of the pressure $P_a$ of the driving fluid within the hydraulic accumulator 21 to be obtained as a function of the actual value of the input signals. According to a preferred embodiment, the mathematical model of the hydraulic circuit 19 envisages using differential equations of the mass balance and energy balance of the hydraulic circuit 19.

On account of inevitable limits of knowledge of the parameters and of accuracy of the mathematical model of the hydraulic circuit 19, the value of the pressure $P_a$ of the driving fluid within the hydraulic accumulator 21 estimated by the mathematical model of the hydraulic circuit 19 can present significant divergences with respect to the actual values in certain moments (typically during fast transients). Consequently, in order to prevent erroneous diagnoses, the comparison between the estimated value of the pressure $P_a$ of the driving fluid within the hydraulic accumulator 21 and the respective actual value of the pressure $P_a$ of the driving fluid within the hydraulic accumulator 21 is carried out only at the end of a step of discharge of the hydraulic accumulator 21 and at the end of a step of charging of the hydraulic accumulator 21.

In particular, at the end of each step of discharge of the hydraulic accumulator 21 a difference $\Delta Ps$ of discharging pressure is calculated, equal to the difference between the estimated value of the pressure $P_a$ of the driving fluid within the hydraulic accumulator 21 and the respective actual value of the pressure $P_a$ of the driving fluid within the hydraulic accumulator 21. In addition, at the end of each step of charging of the hydraulic accumulator 21 a difference $\Delta Pc$ of charging pressure is calculated equal to the difference between the estimated value of the pressure $P_a$ of the driving fluid within the hydraulic accumulator 21 and the respective actual value of the pressure $P_a$ of the driving fluid within the hydraulic accumulator 21.

According to a preferred embodiment, the mathematical model of the hydraulic circuit 19 is initialized alternatively at each start and arrest of the pump 22, in such a way that the error of pressure calculated at the end of each interval upon arrest and start of the pump 22 will represent an index of deviation of the behaviour.

The diagnosis of the component is determined on the basis of the difference $\Delta Ps$ of discharging pressure and of the difference $\Delta Pc$ of charging pressure. For example, a significant increase in the difference $\Delta Pc$ of charging pressure is an index of a more likely leakage or a malfunctioning of the pump 22, and a significant increase in the difference $\Delta Ps$ of discharging pressure is an index of more likely excessive leakages in the hydraulic accumulator 21 and/or in the solenoid valves 23, and/or in the hydraulic actuators 15, 16 and 17. Obviously, in order to compensate for possible accidental errors there is not considered a single value of the differences $\Delta Ps$ and $\Delta Pc$ of pressure, but a number of successive values of the pressure differences $\Delta Ps$ and $\Delta Pc$ are considered, on which statistical analyses are carried out (for example, moving averages).

In other words, the diagnostic method proposes detection of faults in the hydraulic circuit 19 by simulation of the cycles of charging and discharging of the hydraulic accumulator 21. Said faults may, for example, comprise:

- irregular decrease of the duration of the discharge cycles on account of increase of the leakages through the valves, due to wear of the seats;
- irregular decrease in the duration of the discharge cycles on account of increase in the apparent cubic capacities of the chambers of the hydraulic actuators 16, 17 and 18, due to wear of the hydraulic actuators 16, 17 and 18;
- irregular increase in the duration of the cycles of charging of the pump 22, on account of greater internal leakages due to wear;
- irregular increase in the duration of the cycles of charging of the pump 22 on account of loss of insulation of the windings (for example, due to overheating), to which there follows a lowering or, in general, an alteration of the torque-velocity characteristic of the electric motor of the pump 22.

Figure 5:
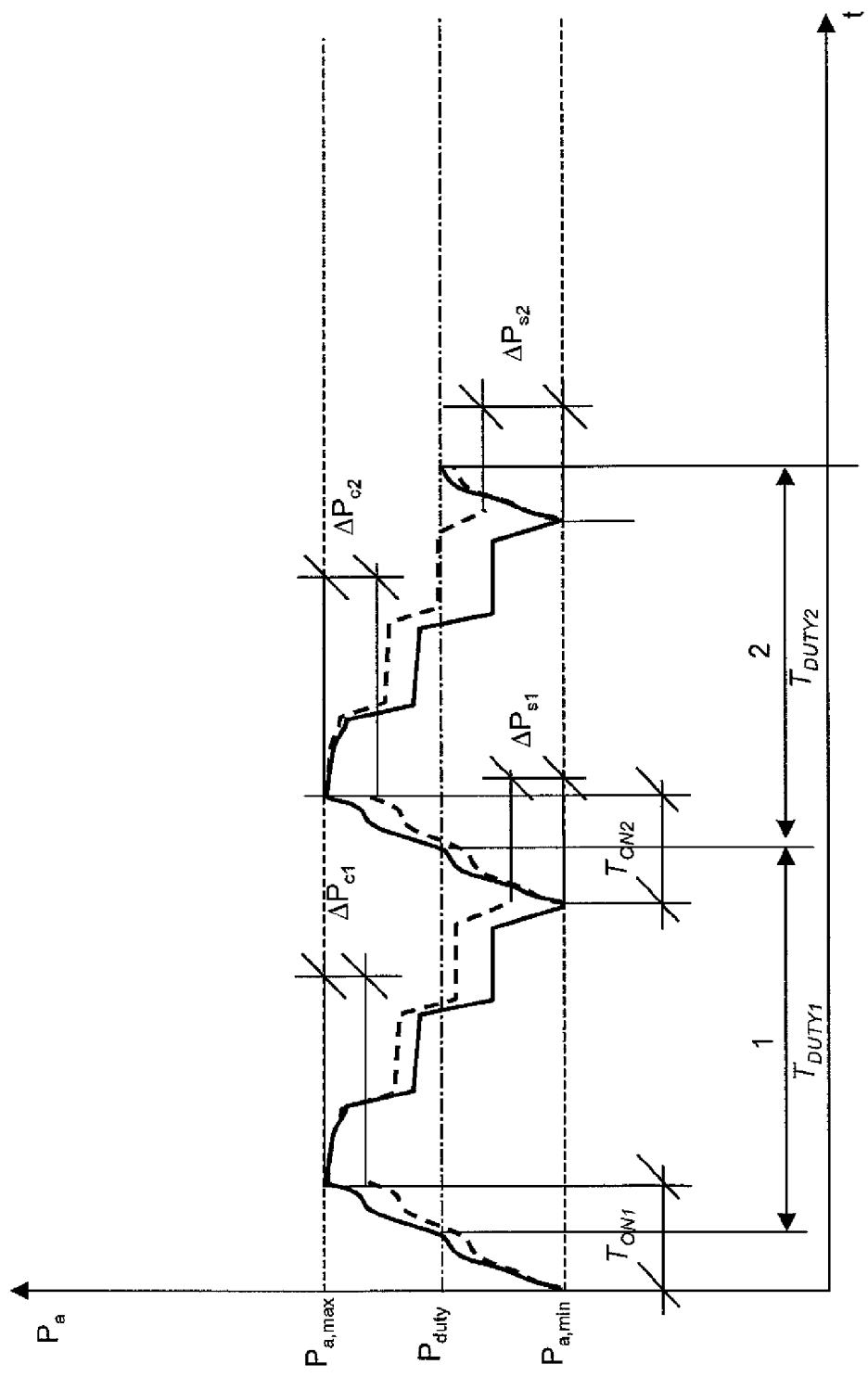
FIG. 5 is a graph that illustrates the evolution in time of the pressure of a driving fluid in a hydraulic accumulator of the hydraulic circuit of FIG. 3.

By way of example, FIG. 5 illustrates the evolution in time of the pressure $P_a$ of the driving fluid within the hydraulic accumulator 21 as a function of time t during two successive cycles (designated by the numbers 1 and 2). Each cycle is conventionally considered as starting and ending between the two successive instants in which the pressure $P_a$ of the driving fluid within the hydraulic accumulator 21 reaches an intermediate value $P_{duty}$ between the minimum value $P_{a,min}$ and the maximum value $P_{a,max}$. In FIG. 5 represented with a solid line is the time evolution of the actual value of the pressure $P_a$ of the driving fluid within the hydraulic accumulator 21, and represented with a dashed line is the evolution time of the estimated value of the pressure $P_a$ of the driving fluid within the hydraulic accumulator 21. In addition, highlighted in FIG. 5 are the differences $\Delta Ps_1$ and $\Delta Ps_2$ of discharging pressure in the two cycles 1 and 2 and the differences $\Delta Pc_1$ and $\Delta Pc_2$ of charging pressure in the two cycles 1 and 2.

According to a preferred embodiment, the output signals comprise also a volumetric efficiency $\eta_v$ calculated for a number N of complete successive cycles and estimated by applying the following equation:

$$\eta_V = \frac{\sum_i \sum_j V_{ij} + Q_{leakSTD} \cdot T_{DUTIES}}{\sum T_{ONi} \cdot Q_{PSTD}}$$

where:

$\eta_v$ is the estimated volumetric efficiency;

$\Sigma_i \Sigma_j V_{ij}$ is the summation of all the "j" volumes of driving fluid consumed by the solenoid valves 23 during the N complete cycles "i";

$Q_{leakSTD}$ is the standard or normal leakage flow of the hydraulic circuit 19;

$T_{DUTIES}$ is the overall duration of the N complete cycles (illustrated schematically in FIG. 5);

$\Sigma TON_i$ is the summation of the times of operation of the pump 22 during the N complete cycles (illustrated schematically in FIG. 5);

$Q_{PSTD}$ is the standard flowrate of the pump 22.

Given that the volumetric efficiency $\eta_v$ takes already into account the normal losses due to leakage, it has a theoretical unit value, i.e., it is not necessary to measure an actual value of the volumetric efficiency $\eta_v$ in so far as the theoretical value and the expected value of the volumetric efficiency $\eta_v$ is always unity. Consequently, the volumetric efficiency $\eta_v$ estimated by means of the above equation is compared with unity to determine the diagnosis of the component.

The diagnostic method described above presents numerous advantages in so far as it enables provision of an effective and efficient preventive diagnosis of components of the automobile 1 (such as, for example, the alternator 12 or the hydraulic circuit 19) that cannot otherwise be diagnosed in a preventive way. It should be noted that the diagnostic method described above is not only able to signal whether a component is effectively functioning badly, but also to signal whether a component has an increasing tendency to malfunctioning, albeit currently operating in a still acceptable way.

In the electronic control unit 11 a method for diagnosing the clutch 15 is implemented, which envisages detecting the velocity $\omega_m$ of rotation of the crankshaft 6, detecting the velocity $\omega_1$ of rotation of the primary shaft 13 of the gear change 12, and determining the difference $\Delta\omega$ of velocity between the velocity $\omega_m$ of rotation of the crankshaft 6 and the velocity $\omega_1$ of rotation of the primary shaft 13 of the gear change 12 when the velocity $\omega_m$ of rotation of the crankshaft 6 is higher than a first threshold value and the torque supplied by the internal-combustion engine 5 is higher than a second threshold value.

The diagnostic method envisages determining a diagnosis of the clutch 15 on the basis of the difference $\Delta\omega$ of velocity and in particular on the basis of the value of the difference $\Delta\omega$ of velocity and/or on the basis of the trend of the difference $\Delta\omega$ of velocity (i.e., on the basis of the value of the first time derivative of the difference $\Delta\omega$ of velocity). It should be noted that even a slight difference $\Delta\omega$ of velocity between the velocity $\omega_m$ of rotation of the crankshaft 6 and the velocity $\omega_1$ of rotation of the primary shaft 13 can be an index of a microslipping of the clutch 15 and hence an index of start of wear of the clutch 15 itself. Obviously, the greater the difference $\Delta\omega$ of velocity, the greater the wear of the clutch 15.

The difference $\Delta\omega$ of velocity between the velocity $\omega_m$ of rotation of the crankshaft 6 and the velocity $\omega_1$ of rotation of the primary shaft 13 is detected only in certain conditions (velocity $\omega_m$ of rotation of the crankshaft 6 higher than a first threshold value and torque supplied by the internal-combustion engine 5 higher than a second threshold value) corresponding to transmission through the clutch 15 of a significant mechanical power. In fact, only when the clutch 15 transmits a considerable mechanical power, is it possible to appreciate in a significant way any possible microslipping. Obviously, to compensate for possible accidental errors, there is not considered just one value of the difference $\Delta\omega$ of velocity, but a number of successive values are considered of the difference $\Delta\omega$ of velocity, on which statistical analyses are carried out (for example, moving averages and trends of the average for definite time intervals).

The diagnostic method described above presents numerous advantages in so far as it enables provision of an effective and efficient preventive diagnosis of the clutch 15, which cannot otherwise be diagnosed in a preventive way. It should be noted that the diagnostic method described above is not only able to signal whether the clutch 15 is effectively functioning badly, but also to signal whether the clutch 15 has an increasing tendency to malfunctioning albeit currently operating in an acceptable way.

The invention claimed is:

1. A method for diagnosing a component of a vehicle and comprising the steps of:
    identifying a series of classes, each of which is associated to a given mode of operation of the component;
    identifying at least one control signal of the component;
    providing a mathematical model of the component designed to classify an evolution in time of the control signal, assigning a respective class to the evolution in time of the control signal itself;
    detecting a number of evolutions in time of the control signal;
    classifying each evolution in time of the control signal by means of the mathematical model of the component; and
    determining a diagnosis of the component on the basis of the classification of the evolutions in time of the control signal.

2. The diagnostic method according to claim 1, wherein the step of classifying each evolution in time of the control signal by means of the mathematical model of the component envisages the further steps of:
    assigning to the evolution in time of the control signal an index of membership in each class; and
    identifying the evolution in time of the control signal as belonging to the class with respect to which it has the highest index of membership.

3. The diagnostic method according to claim 2, wherein the mathematical model of the component uses for each class a respective neural network, which supplies the index of membership in the class itself of an evolution in time of the control signal.

4. The diagnostic method according to claim 2 and comprising the further step of identifying the evolution in time of the control signal as not classified if it is not possible to identify a class with respect to which the evolution in time of the control signal has the highest index of membership.

5. The diagnostic method according to claim 4, wherein declared as not identifiable is a class with respect to which the evolution in time of the control signal presents the highest index of membership if the difference between the two highest indices of membership is not significant.

6. The diagnostic method according to claim 1 and comprising the further steps of:
    obtaining a set of samples, each of which is made up of an evolution in time of the control signal obtained experimentally and a respective class of membership attributed with another method dictated by experience; and
    using the set of samples for defining the mathematical model of the component.

7. The diagnostic method according to claim 6 and comprising the further steps of:
    determining by means of the mathematical model of the component an index of validity of each evolution in time of the control signal, said index of validity indicating the degree of membership of the evolution in time of the control signal to the set of samples; and
    assessing the reliability of the classification of each evolution in time of the control signal as a function of the respective index of validity.

8. The diagnostic method according to claim 7, wherein the mathematical model of the component uses a probabilistic algorithm for determining the index of validity.

9. The diagnostic method according to claim 1, wherein: the component is a servo mechanical gear change (12) comprising at least one engagement actuator (16) that determines engagement of the gears; and the control signal of the component is the position of the actuator (16) for engagement of the gear.

10. The diagnostic method according to claim 9, wherein at least the following three classes are envisaged: normal engagement, false meshing, i.e, engagement in two goes, and engagement with clashing of the gears.

11. The diagnostic method according to claim 9, wherein at least the following four classes are envisaged: engagement with synchronization pause, regular engagement, false meshing, i.e, engagement in two goes, and engagement with clashing of the gears.

12. The diagnostic method according to claim 9, wherein the mathematical model of the gear change (12) envisages at input the evolution in time of the position of the engagement actuator (16), the velocity of rotation of a crankshaft (6), and the gear engaged and/or to be engaged.

13. The diagnostic method according to claim 1, wherein the step of determining a diagnosis of the component on the basis of the classification of the evolutions in time of the control signal envisages the further steps of:
considering a set of temporally consecutive classifications of evolutions in time of the control signal;
determining the frequency percentage of each set of classifications; and
determining a diagnosis of the component on the basis of the frequency percentages.

14. The diagnostic method according to claim 13, wherein the diagnosis of the component is determined on the basis of the values of the frequency percentages and/or on the basis of the trends of the frequency percentages.

15. The diagnostic method according to claim 13, wherein a malfunctioning of the component is diagnosed if at least one class associated to a faulty behaviour has an excessively high frequency and/or has a tendency to increase progressively over time.

16. A method for diagnosing a component of a vehicle and comprising the steps of:
identifying a number of input signals of the component and a number of output signals of the component;
providing a mathematical model of the component in normal operation, which, as a function of the values of the input signals, is able to supply the values of the output signals;
measuring the actual values of the input signals;
measuring the actual values of the output signals;
determining the estimated values of the output signals using the mathematical model of the component and the actual values of the input signals;
comparing the estimated values of the output signals with the respective actual values of the output signals; and
determining a diagnosis of the component on the basis of the comparison between the estimated values of the output signals and the actual values of the output signals.

17. The diagnostic method according to claim 16, wherein the diagnosis of the component is determined on the basis of the deviation between the estimated values of the output signals and the actual values of the output signals and/or on the basis of the trend of the deviation between the estimated values of the output signals and the actual values of the output signals.

18. The diagnostic method according to claim 16, wherein one and the same signal can be simultaneously both an input signal and an output signal.

19. The diagnostic method according to claim 16, wherein the mathematical model of the component uses a neural network for simulating the output signals as a function of the input signals.

20. The diagnostic method according to claim 16 and comprising the further steps of:
obtaining a set of samples, each of which is made up of values measured experimentally of the input signals and of the output signals; and
using the set of samples for defining the mathematical model of the component.

21. The diagnostic method according to claim 20 and comprising the further steps of:
determining by means of the mathematical model of the component an index of validity of the estimated values of the output signals, said index of validity indicating the degree of membership of the actual values of the output signals to the set of samples; and
assessing the reliability of the diagnosis of the component as a function of the index of validity.

22. The diagnostic method according to claim 21, wherein the mathematical model of the component uses a probabilistic algorithm for determining the index of validity.

23. The diagnostic method according to claim 16, wherein the component is an alternator (24), which receives motion from an internal-combustion engine (5), generates the electrical energy used by an electrical load of the vehicle, and is electrically connected to a battery (25).

24. The diagnostic method according to claim 23, wherein the input signals comprise the velocity of rotation of a rotor of the alternator (24), the voltage of the battery (25), and the current supplied by the alternator (24).

25. The diagnostic method according to claim 24, wherein the input signals comprise the temperature of the alternator (24).

26. The diagnostic method according to claim 24, wherein the input signals comprise the temperature of an engine compartment in which the internal-combustion engine (5) is housed.

27. The diagnostic method according to claim 24, wherein the input signals comprise the temperature of a liquid for cooling the internal-combustion engine (5).

28. The diagnostic method according to claim 23, wherein the output signals comprise only the current supplied by the alternator (24).

29. The diagnostic method according to claim 16, wherein the component is a hydraulic circuit (19) comprising a tank (20) containing a driving fluid at ambient pressure, a pump (22) that draws from the tank (20), a hydraulic accumulator (21), which is supplied by the pump (22) and contains pressurized driving fluid, a number of hydraulic actuators (16, 17, 18) provided with chambers that can be filled with the pressurized fluid, and a number of solenoid valves (23) designed to connect the chambers of the hydraulic actuators (16, 17, 18) with the tank (20) or with the hydraulic accumulator (21).

30. The diagnostic method according to claim 29, wherein the hydraulic actuators drive a servo transmission (7) comprising a servo clutch (15) and a servo mechanical gear change (12).

31. The diagnostic method according to claim 29, wherein the input signals comprise the pressure ($P_a$) of the driving fluid within the hydraulic accumulator (21), the logic signal of activation of the pump (22), the logic signal of activation of the solenoid valves (23) and the temperature of the driving fluid.

32. The diagnostic method according to claim 29, wherein the output signals comprise the pressure ($P_a$) of the driving fluid within the hydraulic accumulator (21).

33. The diagnostic method according to claim 32, wherein the comparison between the estimated value of the pressure ($P_a$) of the driving fluid within the hydraulic accumulator (21) with the respective actual value of the pressure ($P_a$) of the driving fluid within the hydraulic accumulator (21) is carried out only at the end of a step of discharge of the hydraulic accumulator (21) and at the end of a step of charge of the hydraulic accumulator (21).

34. The diagnostic method according to claim 33 and comprising the further steps of:
   calculating, at the end of a step of discharge of the hydraulic accumulator (21), a difference ($\Delta Ps$) of discharging pressure equal to the difference between the estimated value of the pressure ($P_a$) of the driving fluid within the hydraulic accumulator (21) and the respective actual value of the pressure ($P_a$) of the driving fluid within the hydraulic accumulator (21);
   calculating, at the end of a step of charging of the hydraulic accumulator (21), a difference ($\Delta Pc$) of charging pressure equal to the difference between the estimated value of the pressure ($P_a$) of the driving fluid within the hydraulic accumulator (21) and the respective actual value of the pressure ($P_a$) of the driving fluid within the hydraulic accumulator (21); and
   determining a diagnosis of the component on the basis of the difference ($\Delta Ps$) of discharging pressure and of the difference ($\Delta Pc$) of charging pressure.

35. The diagnostic method according to claim 29, wherein the output signals comprise a volumetric efficiency ($\eta_v$) calculated for a number N of complete successive cycles and estimated by applying the following equation:

$$\eta_V = \frac{\sum_i \sum_j V_{ij} + Q_{leakSTD} \cdot T_{DUTIES}}{\sum T_{ONi} \cdot Q_{PSTD}}$$

where $\eta_v$ is the estimated volumetric efficiency;
$\Sigma_i \Sigma_j V_{ij}$ is the summation of all the "j" volumes of driving fluid consumed by the solenoid valves (23) during the N complete cycles "i";
$Q_{leakSTD}$ is the standard leakage flowrate of the hydraulic circuit (19);
$T_{DUTIES}$ is the overall duration of the N complete cycles;
$\Sigma TON_i$ is the summation of the times of operation of the pump (22) during the N complete cycles;
$Q_{PSTD}$ is the standard flowrate of the pump (22).

36. The diagnostic method according to claim 35, wherein the volumetric efficiency ($\eta_v$) has an actual value that is equal to unity, and the estimated value of the volumetric efficiency ($\eta_v$) is compared with unity for determining the diagnosis of the component.

37. A method for diagnosing a clutch of a vehicle, which mechanically connects a crankshaft (6) of an internal-combustion engine (5) to a primary shaft (13) of a gear change (12); the diagnostic method comprising the steps of:
   detecting the velocity ($\omega_m$) of rotation of the crankshaft (6);
   detecting the velocity ($\omega_1$) of rotation of the primary shaft (13) of the gear change (12);
   determining the difference ($\Delta \omega$) of velocity between the velocity ($\omega_m$) of rotation of the crankshaft (6) and the velocity ($\omega_1$) of rotation of the primary shaft (13) of the gear change (12) when the velocity ($\omega_m$) of rotation of the crankshaft (6) is higher than a first threshold value and the torque supplied by the internal-combustion engine (5) is higher than a second threshold value; and
   determining a diagnosis of the clutch (15) on the basis of the difference ($\Delta \omega$) of velocity.

38. The diagnostic method according to claim 37, wherein the diagnosis of the clutch (15) is determined on the basis of the value of the difference ($\Delta \omega$) of velocity and/or on the basis of the trend of the differences ($\Delta \omega$) of velocity.

39. The diagnostic method according to claim 37, wherein the diagnosis of the clutch (15) is determined on the basis of the mean value of the difference ($\Delta \omega$) of velocity and/or on the basis of the trend of the average of the differences ($\Delta \omega$) of velocity.

* * * * *